Figure 1:
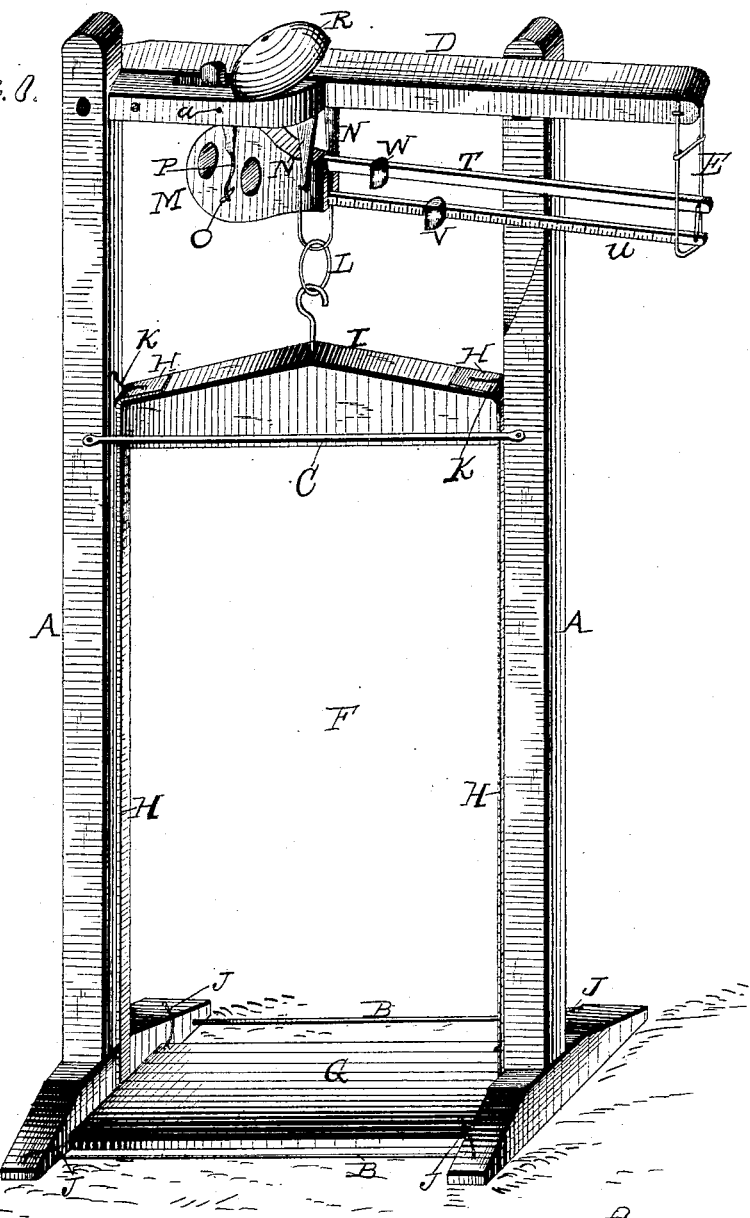

(No Model.) 3 Sheets—Sheet 1.

E. BELL.
PLATFORM SCALE.

No. 291,276. Patented Jan. 1, 1884.

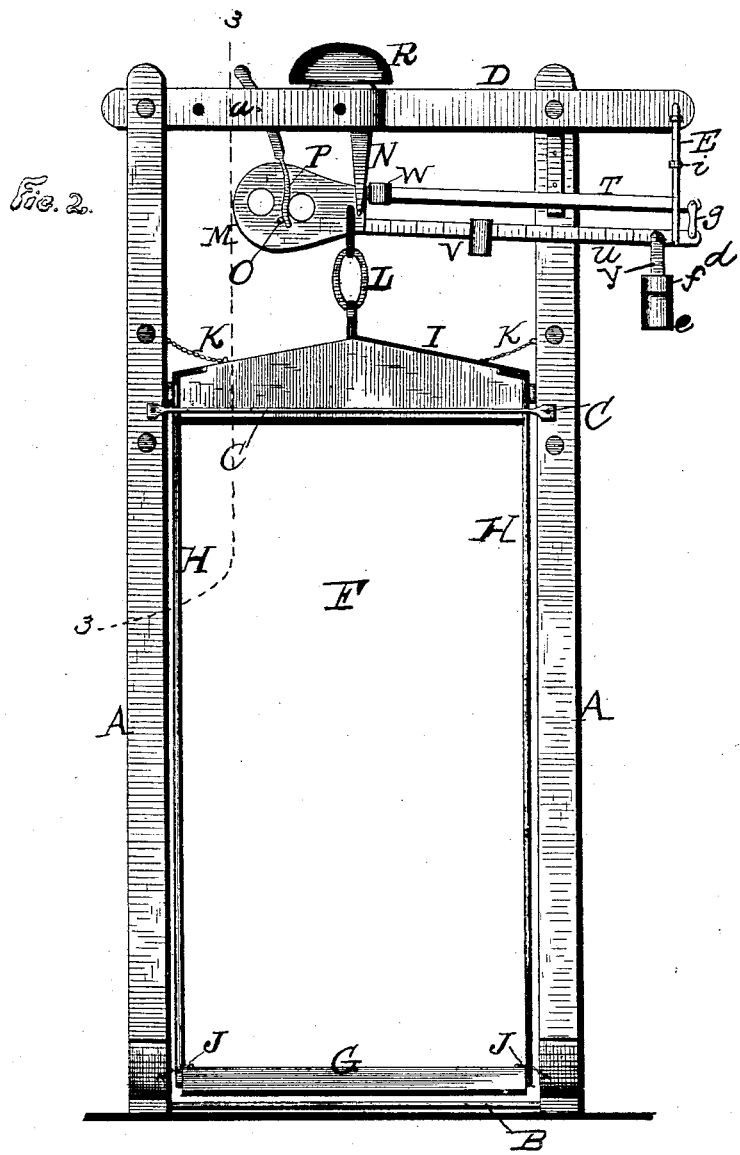

(No Model.) 3 Sheets—Sheet 3.
E. BELL.
PLATFORM SCALE.
No. 291,276. Patented Jan. 1, 1884.
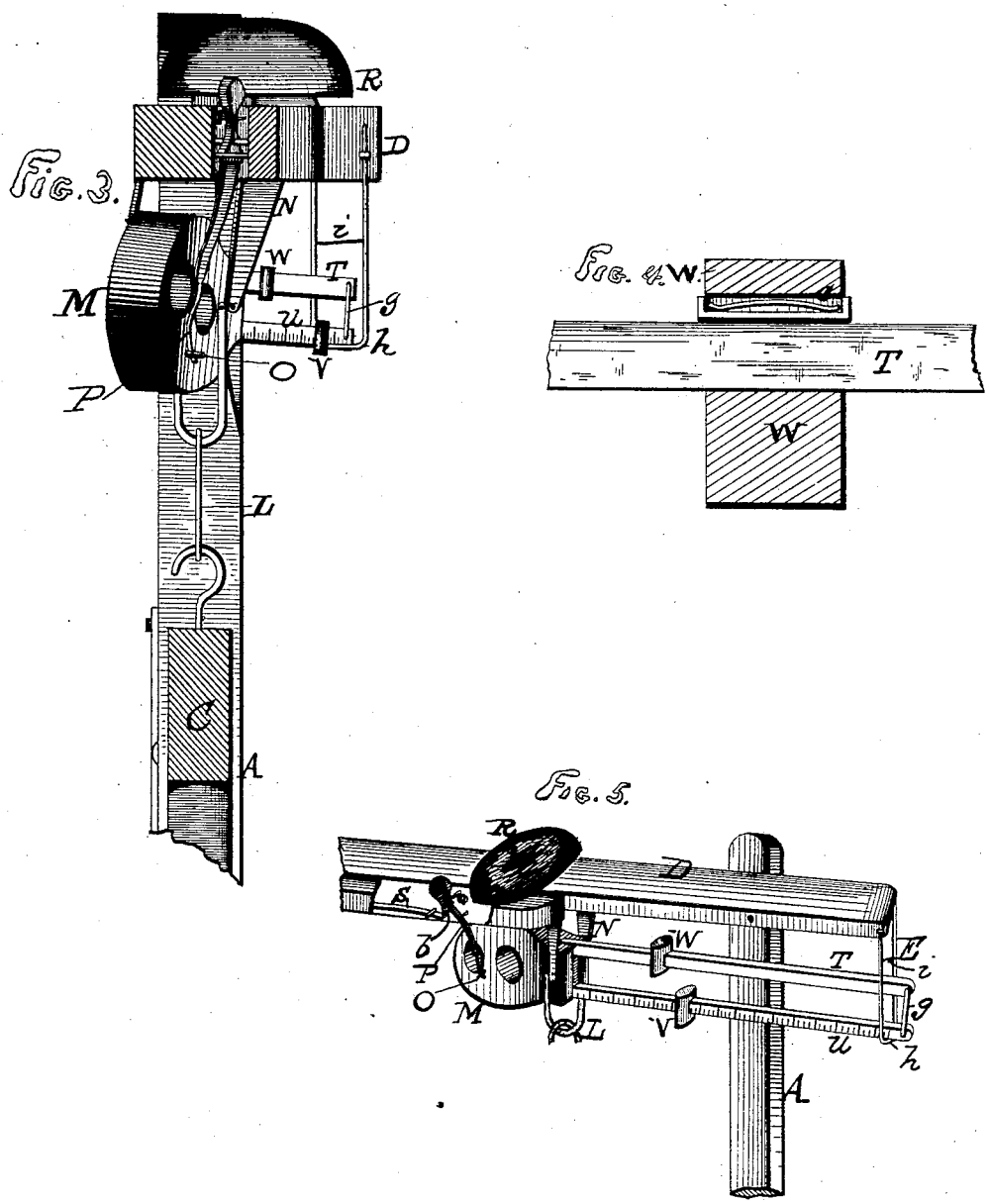
Witnesses:
E. P. Hough
C. C. Jones
Inventor:
Enos Bell
By Chas. J. Gooch
Attorney.

UNITED STATES PATENT OFFICE.

ENOS BELL, OF MINNEAPOLIS, MINNESOTA.

PLATFORM-SCALE.

SPECIFICATION forming part of Letters Patent No. 291,276, dated January 1, 1884.

Application filed September 1, 1883. (No model.)

*To all whom it may concern:*

Be it known that I, ENOS BELL, a citizen of the United States of America, residing at Minneapolis, in the county of Hennepin and State of Minnesota, have invented certain new and useful Improvements in Platform-Scales, of which the following is a specification, reference being had therein to the accompanying drawings.
This invention relates to that class of platform-scales or weighing-machines employed for weighing or measuring liquids or semi-liquids as the same pass from faucets or other sources of supply.
The invention consists, essentially, of a scale adapted to be readily transported from place to place, and to be employed for measuring liquids or semi-liquids as they pass from faucets or other sources of supply of ordinary construction, said scale being provided with a swinging platform, a double scale-beam or steelyard, the lower portion of which is adapted to receive a sliding and also additional removable weights, and the upper portion with a tare-weight, the latter being hollowed out or recessed in its upper portion, and being provided with a spring, by means of which said tare-weight is held steadily in position, an alarm-bell the striker of which is provided with a tail which extends downwardly and connects with a lug or pin projecting outwardly from the front end or counter-balance of the scale-beam in such a manner that upon the beam tilting the tail will be released from contact with the pin and the hammer of the striker allowed to drop and strike the alarm-bell.

In the accompanying drawings, Figure 1 represents a perspective view of my improved scale, showing it as set in position for weighing. Fig. 2 represents a side elevation of the scale-beam with the additional weights in position thereon to adapt the scale for weighing heavy bodies. Fig. 3 represents a vertical section on the line 3 3 of Fig. 2. Fig. 4 represents a detail view of the spring for holding the tare-weight in position. Fig. 5 represents the alarm mechanism, together with the operative portion of the scale-beam.

The frame of the scale consists of upright side bars or standards, A, braced at their lower ends by brace-bars B B, and at the center by other brace-bars, C, and top cross-piece, D, which latter extends at its rear end beyond the standards A, for the purpose of affording support for the scale-beam guiding and retaining loop or sling E.

F represents the platform or balance, provided with a base or platform, G, upon which the receptacle within which the material to be measured is placed, side beams or bars, H, and top cross-beam, I. This platform or balance F is loosely connected at its base by means of chains J, and at its top by means of guy-chains K, with the standards A. By this means the platform is rendered capable of being swung to either side sufficiently to permit of vessels ordinarily too high being tilted thereupon when upon the base, and placed in position under the faucet. The beams C serve as guides for limiting the sidewise movement of the swinging platform or balance.

L represents a chain or other suitable means for connecting the top of the platform or balance, and the counter-balance M of the double beam or steelyard. This counter-balance M is pivotally connected by a strap or hanger, N, attached to the cross-beam D. This counter-balance M has on one side an outwardly-projecting pin or stud, O.

When it is desired to place the alarm mechanism in position for operation, the beam is tilted, so as to lower the pin O. The tail P of the striker is then drawn back and placed against the rear face of the pin O. Then the beam and heel or counter-balance M are released and allowed to resume a straight horizontal position. In this position the tail of the striker is held in a rearwardly-extended position, and consequently the hammer or striker is drawn forward from contact with the gong or bell R. Then, when the steelyard is tilted by the weight upon the base G, the heel or counter-balance M will drop down and release the trigger or pin O from contact with the tail P, whereupon said tail will spring forward and force the hammer or striker against the gong. The striker is pivoted at $a$ in the cross-beam D, and has a shoulder, $b$, which rests upon a spring, S, which is held at one end within a recess in said cross-beam D, its free end impinging against the shoulder $b$ of the striker, so that when the tail is drawn rearwardly, said shoulder will be pressed down upon said spring, and when the tail is released the spring will force the hammer upward and forward against the gong.

The steelyard or beam is constructed of two beams, namely, the tare or upper beam, T, having plain upper edge, and the lower or weighing beam, U, which latter may be either plain or notched on its upper edge, as desired, and has on one side face the customary scale or weight marks.

V represents the customary sliding pea or weight, and W the tare-pea. This latter is recessed or hollowed out interiorly, as shown, for the reception of a plate-spring, G, of bowed form centrally, its ends resting upon the top edge of the tare-beam with sufficient resistance to hold the pea W steady in the position in which it is placed when the amount of tare is discovered. By pressing downward upon pea W, it can, whenever desired, readily be slid along the tare-beam from one position to another until the weight of the vessel into which the material to be measured is counterbalanced.

$d$ represents a hook or projection upon one face of the lower or weighing beam, U, and Y represents a rod adapted to be attached at its upper end to said hook or projection $d$. Rigidly attached to the bottom of this rod is a weight, $e$, of circular or any other shape or form.

$f$ represents another or a series of additional weights adapted to be slid vertically upon said rod Y. The object of this removable rod Y, and the removable weights $e$ and $f$, is for the purpose of increasing the weighing capacity of the scale whenever it is desired to weigh beyond the limit of the scale-beam U and pea V. The two beams are connected together at their rear ends by a strap, $g$, and the movement vertically of the said beams within the hanger E is regulated by the bottom $h$ and the cross-piece $i$ thereon.

The advantages secured by the weighing-beam W and pea V, and the removable rod Y, and weights $e$ and $f$, are great weighing capacity in small space. The spring-pea will stay in place.

The swinging platform is so constructed as to be very low down, and is fastened with guy-chains K, so as to obtain full vertical motion of the platform without friction. By the present arrangement the platform is arranged lower down than any ordinary platform-scale. The guy-chains prevent friction between the side bars, H, and the uprights A of the frame, and allow a space between platform and frame, so that nothing will clog up. The whole apparatus can be readily moved from one faucet to another or from place to place, as its operation does not depend upon the peculiar construction of any source of supply, and it can be readily removed after using, so as to avoid the dripping from the faucet.

In operating this scale, it is first placed in such position so that when the jug, can, or other vessel to contain the article to be measured or weighed is placed on the platform, the mouth will be directly under the gate of the faucet or other source of supply. Then place the vessel on as near the center as possible. Run the lower sliding pea to the left as far as it will go, and balance the vessel with the upper pea. Then open the gate or source of supply gradually, taking precaution to see that the vessel is in just the right position. If the article to be drawn delivers slowly from any cause, do not put the under or weighing pea at the exact amount wanted, but put it at from one to one and a half pound less, so as to prevent an overflow during the time elapsing after the alarm, until the attendant can close the gate or supply. Then set the alarm by drawing the lower extremity of the striker to the right, until it passes over and catches over the pin in the heel or counter-balance of the scales. Thus arranged it may be left until the alarm is sounded by the tipping of the beams liberating the striker, after which it will be necessary to put the lower pea at the exact amount required, and close the gate gradually until the tipping of the beam shows that the amount required has passed into the vessel, which concludes the operation, after which it is best to set the scale aside a little, so that any leakage from the faucet will not drip on the platform. When any larger amount has to be weighed than is provided for by the weighing-beam, place the rod Y, with its attached weight or any additional number of weights, thereon, as required.

Having thus described my invention, what I claim therein, is—

1. The combination, in a platform-scale, of a platform, a scale-beam or steelyard having a heel or counter-balance, means, substantially as described, for connecting the beam and platform, a pin or trigger attached to said counter-balance, a gong or alarm, and a hammer or striker having a tail adapted to engage said pin or trigger, and upon the tilting of said beam to be released from the said trigger and cause the hammer to strike the gong, substantially as and for the purpose set forth.

2. In a platform-scale, the combination, with the platform, and a scale-beam having a pin or trigger projecting therefrom, of a pivotal striker having a tail adapted to engage with said trigger, a spring adapted to engage and actuate said striker, as explained, and a gong or other suitable alarm, substantially as and for the purpose set forth.

3. A platform-scale having a platform capable of vertical and swinging movement, a steelyard having scale and tare beams, permanent and removable weights, a spring-held tare-pea or weight, a suitable pin or trigger, and a pivoted spring-actuated striker adapted at its lower end to engage with said pin or trigger, and at its upper end to strike a gong or alarm, substantially as and for the purpose set forth.

In testimony whereof I affix my signature in presence of two witnesses.

ENOS BELL.

Witnesses:
N. F. AKSEKIN,
GEORGE ODLUM.